Nov. 8, 1955     R. B. COTTRELL     2,723,008
BRAKE BEAM SAFETY GUARD

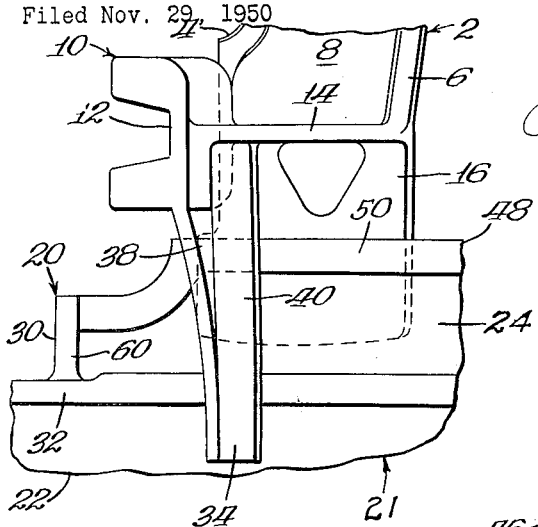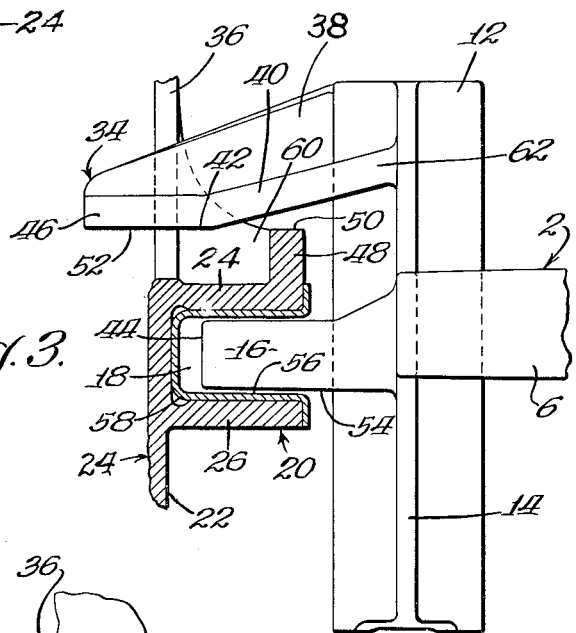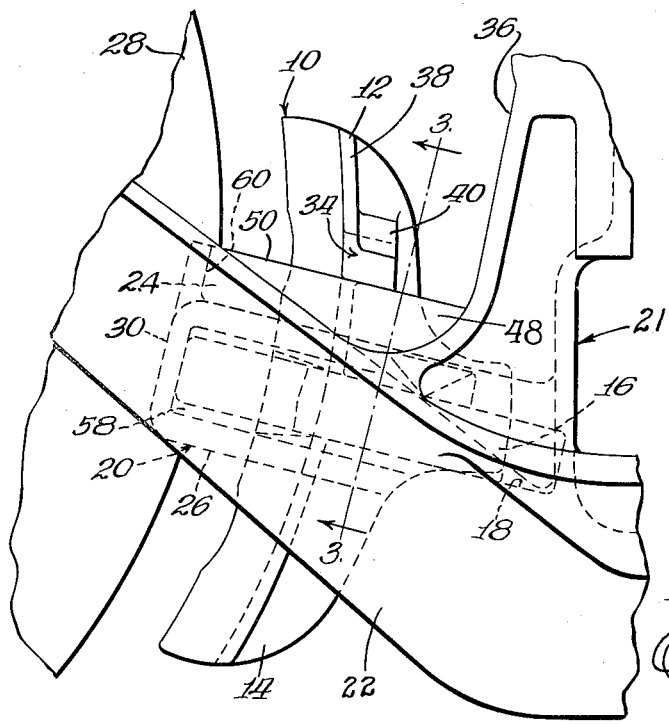

INVENTOR.
Robert B. Cottrell

United States Patent Office 2,723,008
Patented Nov. 8, 1955

2,723,008

BRAKE BEAM SAFETY GUARD

Robert B. Cottrell, Chicago, Ill., assignor to American Steel Foundries, Chicago, Ill., a corporation of New Jersey Application November 29, 1950, Serial No. 198,209

6 Claims. (Cl. 188—212)

This invention relates to railway brake equipment and more particularly to a novel auxiliary support for parts of the brake equipment for holding the parts from falling to the roadbed on failure of the primary supports or separation thereof.

The principal object of the invention is to provide a novel and inexpensive arrangement for supporting a brake beam from the truck side frames.

A more specific object of the invention is to provide arms on the brake beams which are adapted to project through window openings of an associated side frame.

A further object of the invention is to provide in an arrangement wherein brake beams have extensions supported within brackets on the inboard sides of the side frames, auxiliary supports which are arranged to extend through the side frame window openings and to engage along areas which maintain the brake beam extensions in position to re-enter the brackets after the extensions are withdrawn from the brackets when the side frames move away from each other.

Another object of the invention is to provide brake beam supports to maintain the brake beam extensions in position to reenter the side frame brackets during servicing of the truck as, for example, when changing wheels.

A further object of the invention is to devise the auxiliary supports and their areas of engagement with the side frames in such manner that, when the brake parts are in normal operative position, the auxiliary guides and said areas of engagement are disengaged so that the functioning of the brake equipment is not hampered in any way.

These and other objects of the invention will become more apparent from the specification and the drawings, wherein:

Figure 1 is a fragmentary top plan view of one end of a brake beam and associated side frame incorporating the invention;

Figure 2 is a fragmentary side elevational view of the structure; and

Figure 3 is a fragmentary sectional view, taken substantially on the line 3—3 of Figure 2, the brake beam and head being shown in elevation.

Figure 4:
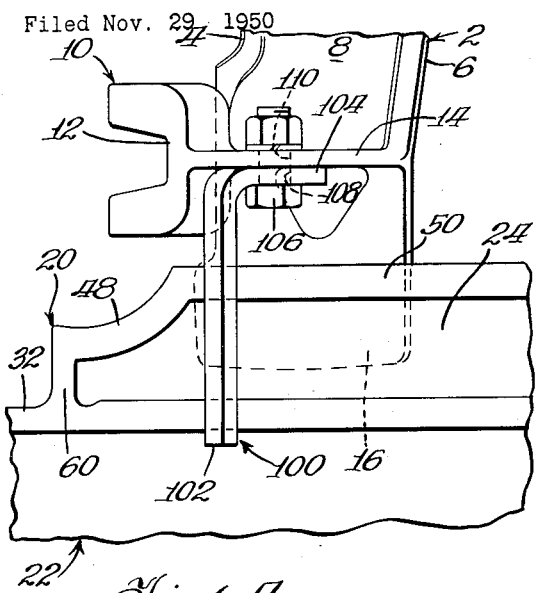
Figures 4, 5 and 6 illustrate a modification of the invention and are views similar to Figures 1, 2 and 3 respectively.

Describing the invention in detail and referring first to the embodiment shown in Figures 1 to 3, the brake beam, generally designated 2, may be of conventional design such as shown in applicant's United States Patent 2,499,905, issued March 7, 1950, for Brake Beam. The brake beam may comprise the usual truss structure with tension and compression members 4 and 6 which may merge into a gusset 8 at each end of the beam which may be formed integral with a brake head 10. The brake head 10 may have the usual front wall 12 which may be formed integral with a substantially vertical transverse rear wall or rib 14, the inboard side of the wall 14 merging with the outboard extremity of the truss structure 2, and the outboard side of the wall 14 being provided with a support lug 16, the lug extending diagonally with respect to the plane of the beam. The lug 16 preferably may also be formed at the inboard extremity of its forward edge integral with the rear side of the front wall 12 of the brake head.

The lug 16 extends into a slot 18 in a bracket 20, which is formed on the inboard side of the tension member 22 of a conventional side frame 21 which may be of the type shown in United States Patent 2,508,020, issued to J. E. Flesch and E. G. Opsahl on May 16, 1950, for Side Frame Bracket. The bracket comprises top and bottom substantially parallel webs 24 and 26 defining the before-mentioned slot 18 therebetween, the slot extending lengthwise radially with respect to the axis (not shown) of the adjacent wheel 28. The ends of the webs 24 and 26 adjacent to wheel 28 are interconnected by a web 30. The outboard edges of webs 24, 26 and 30 are formed integral with the inboard web 32 of the tension member 22.

It will be understood that the brackets 20 are formed at opposite sides of the usual bolster opening in the frame that is adjacent each wheel.

To guard against accidental conditions of disengagement and also to support the brake beam in the event of failure of the primary supports, that is the brackets or the guide lugs, each brake head of the beam is provided with an auxiliary safety guard 34. The safety guard 34 is formed integral with the upper part of the brake head and extends outboardly from the brake head above the adjacent guide lug 16 in vertical spaced relationship thereto and above the adjacent bracket 20 and through the window opening 36 in the adjacent end of the side frame. The member 34 is substantially L-shaped in end view and comprises a substantially vertical wall 38 which extends from the outboard edge of the front wall 12 of the brake head 10. The lower edge of wall 38 is formed integral with the forward edge of an angularly extending bottom wall 40, the inboard extremity of the forward edge of which merges with the rear side of the front wall 12. The inboard end of wall 40 merges with the outboard side of the wall 14 of the brake head.

Referring now to Figure 3, it will be noted that the bottom wall 40 of the guard 34 slopes downwardly outboardly of the brake beam to a point 42 which is located substantially in the plane of the outboard side 44 of the guide lug 16.

The inboard extremity of the top web 24 of the bracket 20 is provided with an upstanding flange 48, said flange preferably extending from the forward extremity of web 24 to the rear extremity thereof. The flange 48 provides a top surface 50 which is substantially coplanar with surface 52 on the bottom of portion 46 of wall 40 of the safety guard when the bottom side 54 of the guide lug 16 is seated at the bottom 56 of the slot 18 in the bracket 20. It will be seen that the slot 18 is preferably lined with a wear resistant liner 58. The forward extremity of the flange 48 may merge with an upwardly projecting extension 60 of the front wall 30 of the bracket and the extension may merge into the inboard wall 32 of the tension member 22. It will be observed that when the guide lug 16 is about to be withdrawn from the slot 18, the bottom side 52 of the outboard extremity of the auxiliary support 34 engages the top surface 50 of the flange 48 whereby the brake beam is prevented from dropping and at the same time is held in position with the lug 16 aligned with the slot 18 so that as the side frame and brake beam move toward each other, the guide 16 readily reenters the slot 18 and the outboard end of the auxiliary support 34 slides off the surface 50 in view of the diagonal disposition of the inboard portion 62 of the wall 40. This feature permits the beam to be guided and supported solely by its primary supports 16 and 20 and does not interfere with or hamper the normal operation of the brakes.

Figure 6:
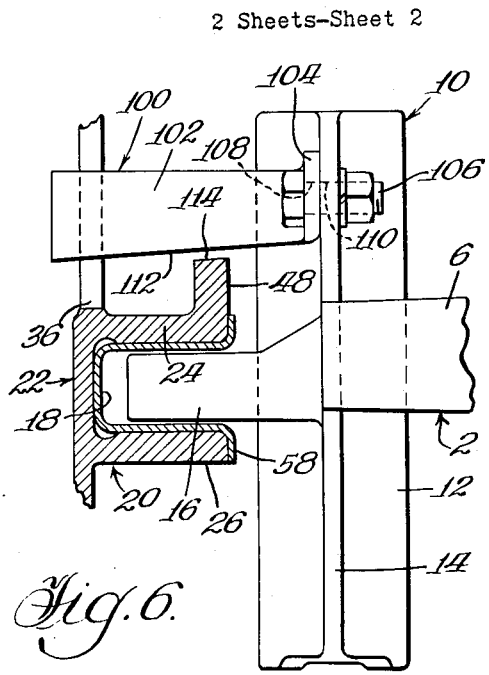
Figure 5:
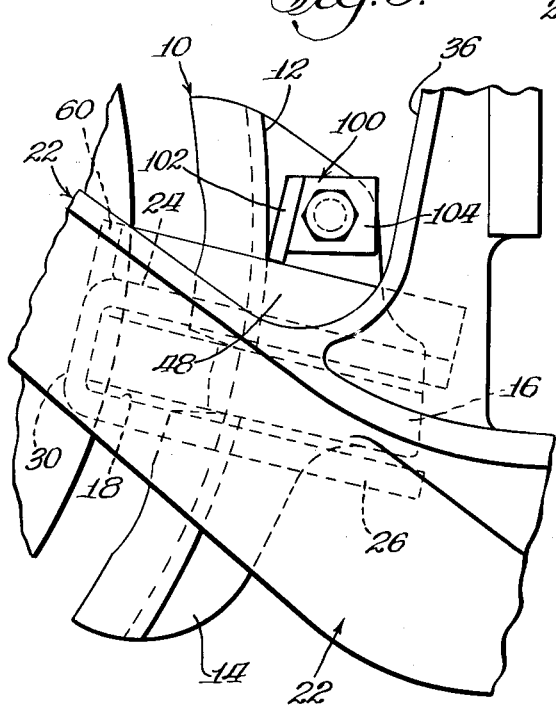

Referring now to the embodiment shown in Figures 4 to 6 wherein parts identical with those in the previous embodiments are identified by corresponding reference numerals. The present embodiment differs from the previous in the form of the safety guard 100 and in its connection to the brake head. The guard 100 comprises a flat bar of metal with an extension 102 which passes over the top of the bracket 20 and through the openings 36 in the side frame. The forward side of the portion 102 seats at its inboard end against the rear side of the front wall 12 of the brake head 10 and the inboard extremity is connected to the forward end of a leg 104 which extends angularly with respect to the portion or leg 102 and seats flat against the outboard side of the rear wall 14 of the brake head. The portion 104 is connected to the upper part of the brake head wall 14 by means of a nut and bolt assembly 106 which extends through aligned transverse openings 108 and 110 in the portion 104 and wall 14 respectively. It will be noted that the bottom edge of the portion 102 slopes downwardly in a direction outboardly of the beam and the top edge of the flange 48 of the bracket 20 is similarly sloped so that flat face engagement is obtained between the bottom edge 112 and the surface 114 of the top of flange 48 at the moment that the lug 16 is withdrawn from the pocket 18.

Figure 7:
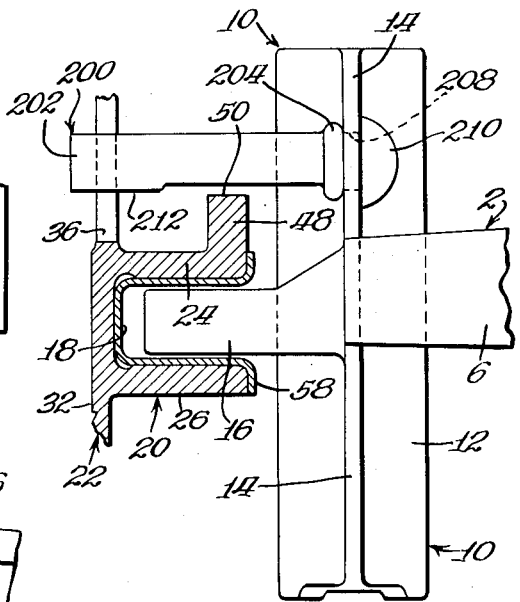
Figure 7 is a view similar to Figure 6 and illustrating a further embodiment of the invention.

Referring now to Figure 7, wherein parts identical with those in the previous embodiment are identified by corresponding reference numerals. It will be seen that the present embodiment differs from the previous one in that the guard 200 is in the form of a rod and comprises a cylinder extension 202 which projects outboardly of the outboard extremity of the brake beam over the bracket 20 and through the window opening 36. The portion 202 is provided adjacent to its inboard end with a shoulder 204 which is buttressed against the outboard side of the wall 14 of the brake head 10. Inboardly of the shoulder 204 the portion 202 extends through a complementary opening 208 in the upper portion of wall 14 and inboardly the wall 14 is riveted or peened over to form a head 210 which engages the inboard side of the wall 14. It will be seen that the rod is flattened on its bottom side to a point in the plane of the outboard side of the lug 16 to afford clearances for the top edge of the flange 48 when the parts are in normal operative position. Outboardly of the plane, the rod provides a surface 212 which is adapted to engage on the surface 50 on the top edge of flange 48 so as to maintain the adjacent end of the beam at a level so that its lug 16 will re-enter the slot 18.

It should be noted, as hereinbefore stated, that the upwardly facing surfaces 50 and 114, of the respective embodiments, are arranged substantially parallel to the long axis of the slot 18, said axis of the slot 18 being radially arranged relative to the axis of the wheel to the braked. Directing attention to Figure 3, it will be seen that the arm 38, when the beam is normally positioned in the slot 18, is spaced only a relatively short distance above the surface 50. Also the arm 200 is similarly spaced above the surface 50 again when the beam is in normal position. The same is true for the arm 100 in the third embodiment as seen in Figure 6, namely, that the arm 100 is spaced only a short distance above the surface 114 when the beam is in normal position. It will be readily appreciated by those familiar with the art that upon failure of the lower lug 26 of the bracket 20, in the several embodiments, the beam 6 will fall only a short distance before the various auxiliary support arms contact the upwardly facing surfaces to support the beam. In this position, the support arm becomes more than a mere safety support to prevent the beam from falling to the track and causing derailment. The particular parallel relation of the surfaces 50 and 114 acts as a guide when engaged with the related support arm to accurately and satisfactorily guide the beam and its carried shoes into braking engagement with the related wheel when the beam is actuated in the conventional manner. Thus it will be seen that the arrangement provides an operating unit even though the primary support means, namely the bracket 20, is no longer present.

I claim:

1. In a brake arrangement, a side frame, having a window formed therein, a brake beam horizontally separable from said frame, means to support the beam from the side frame consisting of a flat lug on the end of the beam, and a bracket defining a slot on the frame loosely receiving said lug, said bracket being connected to the frame immediately below the window formed in the frame, an auxiliary support arm associated with the beam and extending outboardly thereof through the window and outboardly beyond the end of said lug, an upwardly facing surface parallel to said slot, located on said frame directly above the bracket, a downwardly facing surface on said arm at the outboard extremity of said arm, both of said surfaces being substantially vertically equally spaced from said flat lug and said downwardly facing surface being horizontally spaced in an outboard direction from said upwardly facing surface when the beam is supported by said bracket, said surfaces being engageable to support said beam coplanar and with the lug horizontally aligned with the slot upon such horizontal separation of the beam and side frame as would withdraw the lug from said bracket.

2. A brake arrangement according to claim 1, including a brake head carried by said beam, and wherein the auxiliary support arm is integrally formed with the head.

3. A brake arrangement according to claim 1, including a brake head carried by said beam, and wherein the auxiliary support arm is removably connected to the head.

4. In a brake arrangement, a wheel and axle assembly, a side frame having a window therein, a brake beam horizontally separable from the side frame, a brake head and shoe assembly carried by said brake beam and movable into braking engagement with the wheel, primary means to support the beam from the side frame consisting of a flat lug on the end of the beam, and a bracket defining a slot on the frame movably receiving said lug, said bracket being connected to the frame immediately below the window formed in the frame, an auxiliary support arm connected to the brake head and extending outboardly thereof through the window and outboardly beyond the end of said lug, an upwardly facing surface generally parallel to said slot, located on said frame directly above the bracket and immediately below a portion of said arm, a downwardly facing surface on said arm at the outboard extremity of the arm, both of said surfaces being substantially vertically equally spaced from said flat lug and said downwardly facing surface being horizontally spaced in an outboard direction from said upwardly facing surface when the beam is supported by said bracket, said surfaces being engageable to support said beam coplanar and with the lug horizontally aligned with the slot upon such horizontal separation of the beam and side frame as would withdraw the lug from said bracket, said upwardly facing surface being engageable with the portion of said arm upon fracture of said bracket whereby the lug would fall from said slot, the upwardly facing surface extending forwardly toward the wheel to act upon fracture of said bracket as a supporting guide for the beam and brake head assembly upon actuation thereof.

5. In a brake arrangement, a wheel and axle assembly, a side frame carried thereby, said frame having a window formed therein, a brake beam, a brake head and shoe assembly carried by said brake beam and actuable into braking engagement with the wheel, primary means to support the beam from the side frame consisting of a flat lug on the end of the beam and a bracket defining a slot on the frame loosely receiving said lug, said bracket extending forwardly toward the wheel in a generally horizontal plane to guide the brake head and shoe assembly into engagement with the wheel upon actuation of the beam, said bracket being connected to the frame immediately below the window formed in the frame, an auxiliary support arm associated with the beam and extending into the window, an upwardly facing surface substantially parallel to said slot located on said frame approximately above the bracket, a downwardly facing surface on said arm spaced a relatively short distance from said upwardly facing surface when the beam is supported by said bracket, said surfaces being engageable to support said beam upon fracture of said bracket whereby the lug would fall from said slot, the upwardly facing surface extending forwardly toward the wheel to act upon fracture of said bracket as a supporting guide for the beam and brake head assembly upon actuation thereof.

6. In a brake arrangement, a wheel and axle assembly, a frame supported thereby, a brake beam, a brake head and shoe assembly carried by said brake beam and actuable into braking engagement with the wheel, primary means to support the beam from the frame, said primary means extending forwardly toward the wheel in a generally horizontal plane to guide the brake head and shoe assembly into braking engagement with the wheel, a window in the frame generally above the level of the beam, an auxiliary support arm associated with the beam and extending into the window, an upwardly facing surface located on the frame in the window as seen in side elevational view and approximately radially arranged relative to the axis of said assembly, said arm having a substantially horizontal portion disposed a relatively short distance above said upwardly facing surface when the beam is supported by said primary means, said upwardly facing surface being engageable with said portion of said arm upon failure of said primary support means, the upwardly facing surface extending forwardly toward the wheel to act upon fracture of said primary means as a supporting guide for the beam and brake head assembly upon actuation thereof.

References Cited in the file of this patent
UNITED STATES PATENTS

| | | |
|---|---|---|
| 1,923,120 | Shafer | Aug. 22, 1933 |
| 2,226,551 | Busse | Dec. 31, 1940 |
| 2,383,955 | Busse | Sept. 4, 1945 |